United States Patent
Parkvall et al.

(10) Patent No.: US 10,820,339 B2
(45) Date of Patent: Oct. 27, 2020

(54) TRANSMISSION HOLES IN LONGER TRANSMISSION INTERVALS

(71) Applicant: Telefonaktiebolaget LM Ericsson (publ), Stockholm (SE)

(72) Inventors: Stefan Parkvall, Bromma (SE); Robert Baldemair, Solna (SE); Håkan Björkegren, Täby (SE); Erik Dahlman, Stockholm (SE); Karl Werner, Segeltorp (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/533,823

(22) PCT Filed: Oct. 28, 2016

(86) PCT No.: PCT/EP2016/076112
§ 371 (c)(1),
(2) Date: Jun. 7, 2017

(87) PCT Pub. No.: WO2017/072313
PCT Pub. Date: May 4, 2017

(65) Prior Publication Data
US 2017/0374676 A1 Dec. 28, 2017

Related U.S. Application Data

(60) Provisional application No. 62/247,502, filed on Oct. 28, 2015.

(51) Int. Cl.
*H04W 72/12* (2009.01)
*H04L 1/00* (2006.01)

(52) U.S. Cl.
CPC ....... *H04W 72/1273* (2013.01); *H04L 1/0002* (2013.01)

(58) Field of Classification Search
CPC .................. H04W 72/1273; H04L 1/0002
See application file for complete search history.

(56) References Cited

U.S. PATENT DOCUMENTS

2006/0171345 A1 8/2006 Hildebrand et al.
2008/0171547 A1* 7/2008 Moon ............... H04W 36/06
455/436

(Continued)

FOREIGN PATENT DOCUMENTS

| EP | 2169869 A2 | 3/2010 |
|---|---|---|
| JP | 2004312635 A | 11/2004 |
| WO | 2004057894 A1 | 7/2004 |

*Primary Examiner* — Justin T Van Roie
(74) *Attorney, Agent, or Firm* — Murphy, Bilak & Homiller, PLLC

(57) ABSTRACT

In an aspect, a transmitting node schedules a downlink transmission to a first UE over a first transmission interval having a predetermined length and starts the downlink transmission to the first UE in the first transmission interval. The transmitting node stops the downlink transmission to the first UE prior to an end of the first transmission interval to create a first end of a transmission hole in the downlink transmission to the first UE and resumes the downlink transmission to the first UE at a second end of the transmission hole. The transmitting node may receive an uplink transmission from a second UE or transmit a higher priority transmission, within the transmission hole.

12 Claims, 16 Drawing Sheets

(56) References Cited

U.S. PATENT DOCUMENTS

2011/0002365 A1\* 1/2011 Khayrallah ........ H04B 1/71072
375/148
2015/0271816 A1 9/2015 Sambhwani et al.
2015/0381390 A1\* 12/2015 Heo .................... H04L 25/0232
375/232

\* cited by examiner

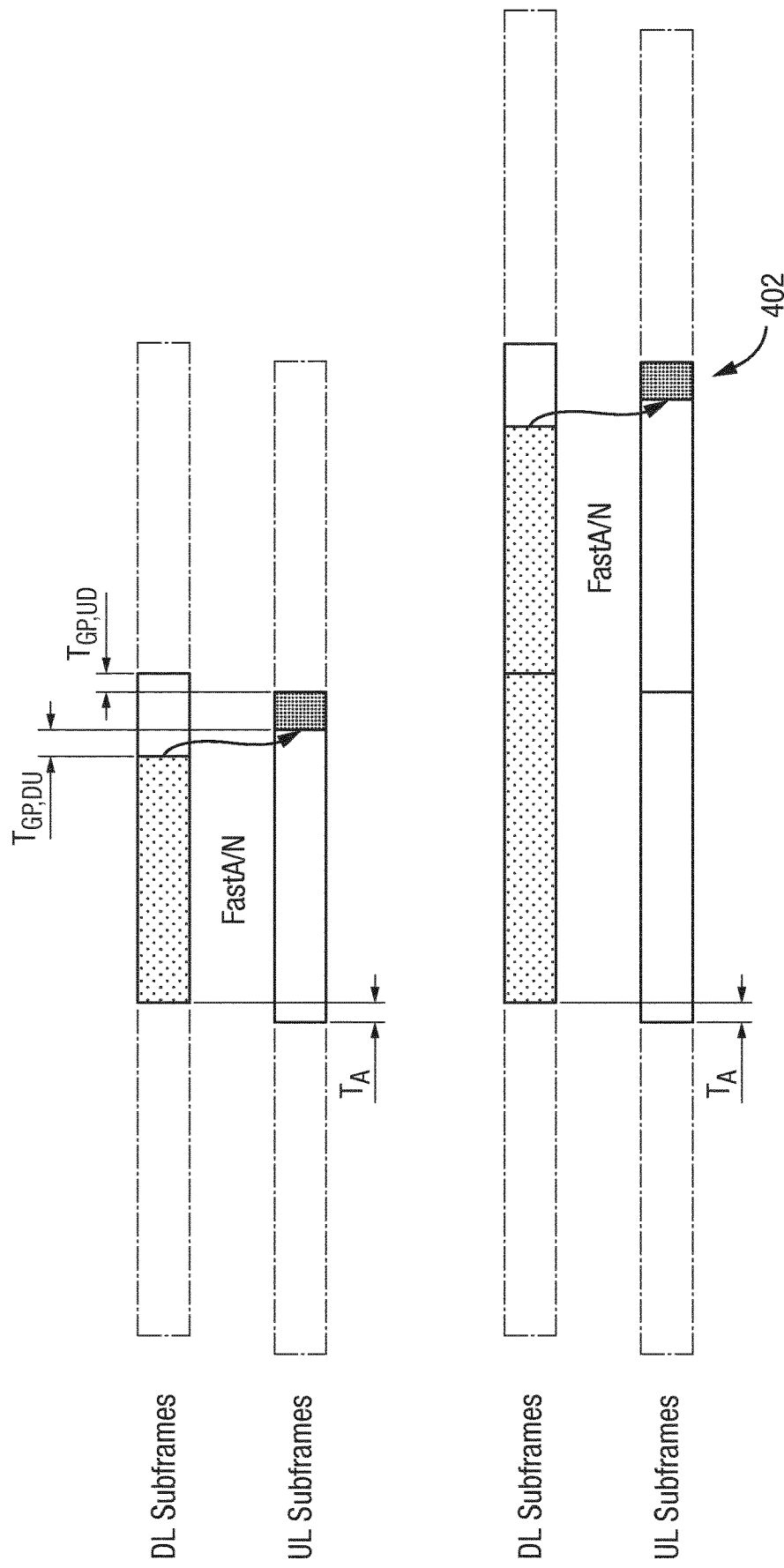

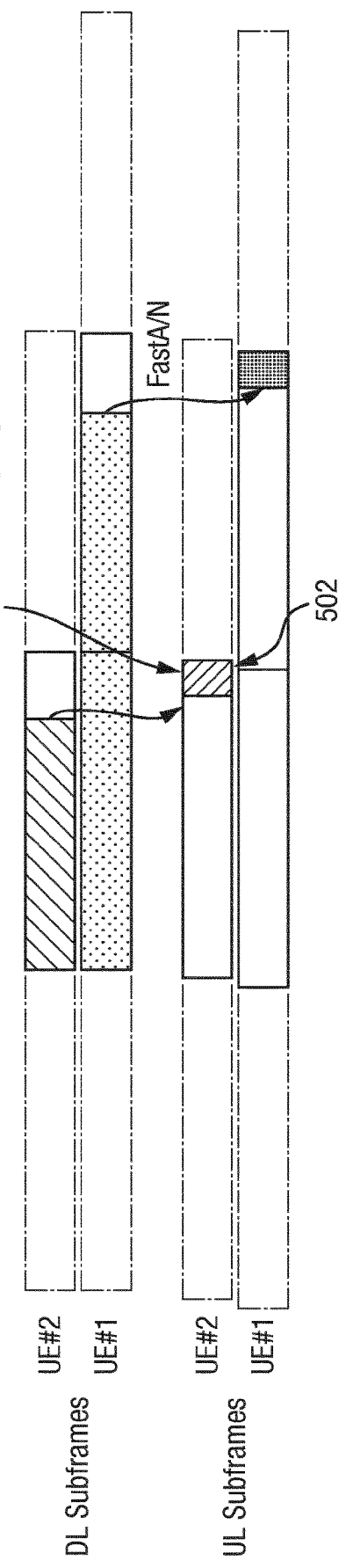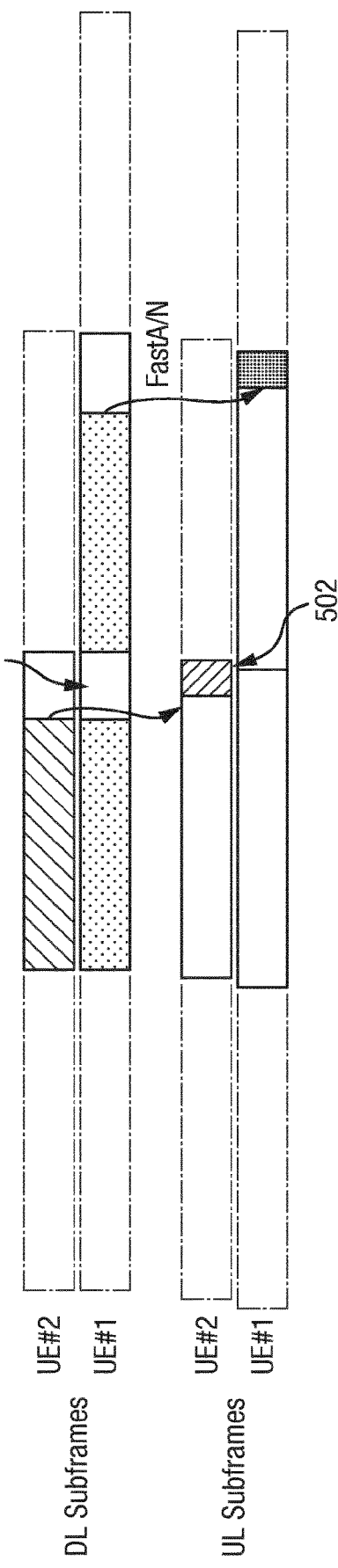

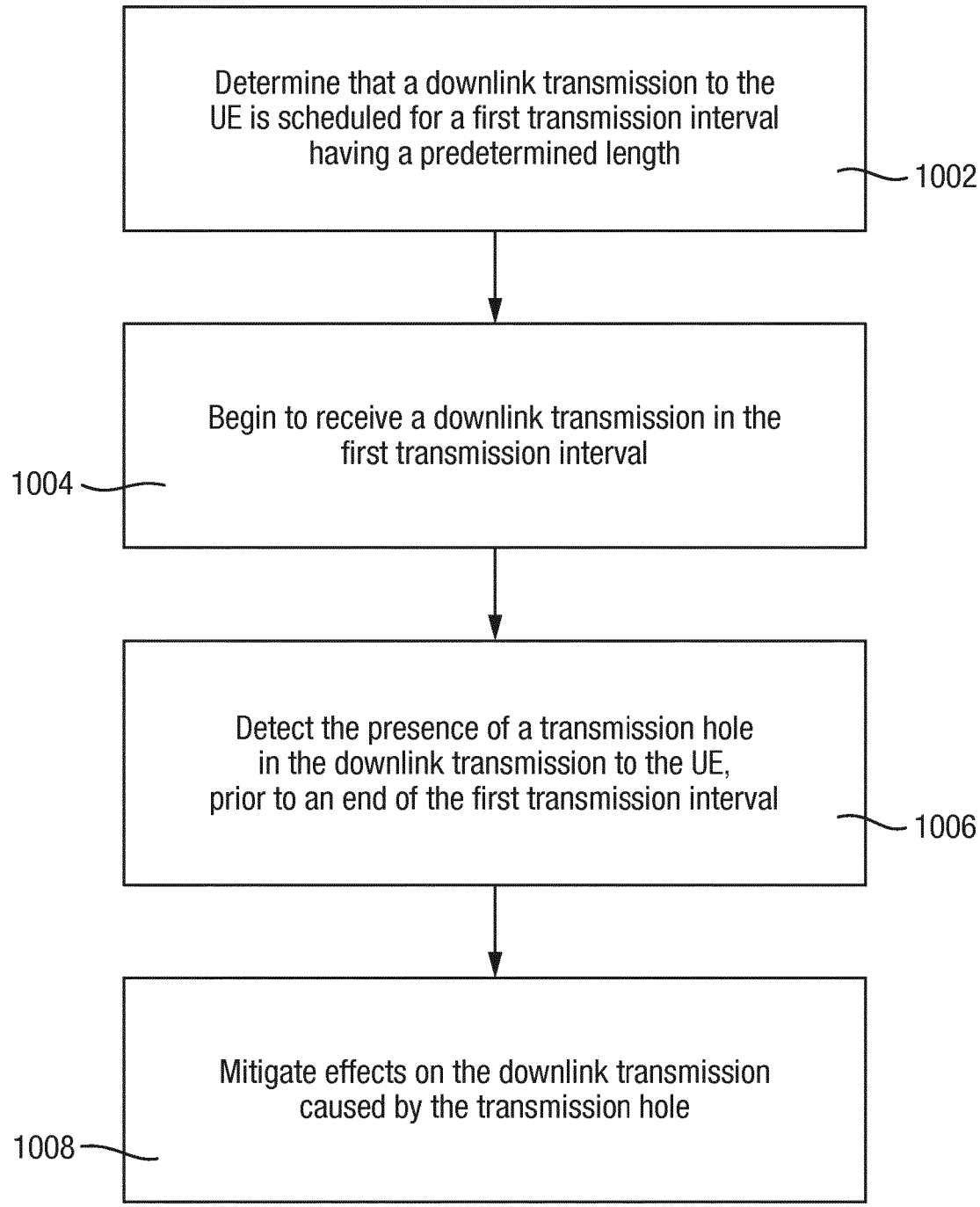

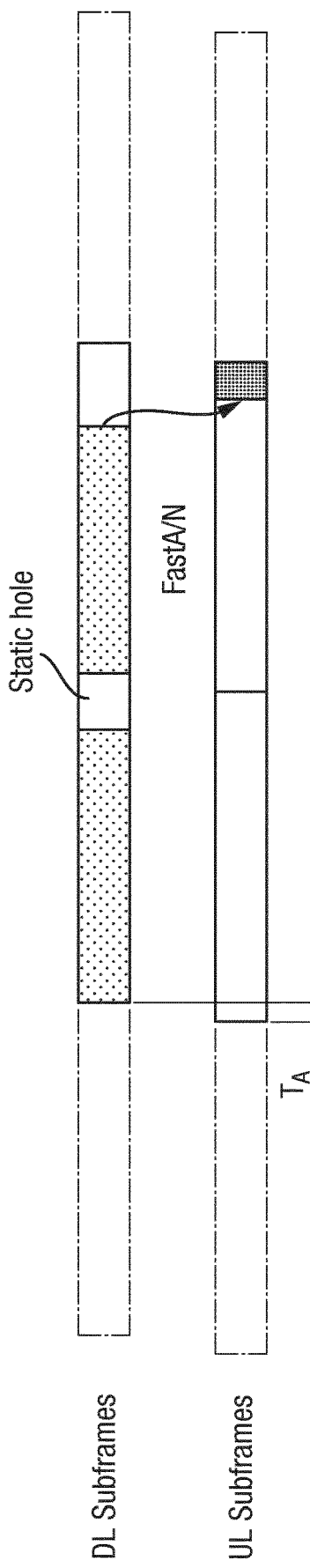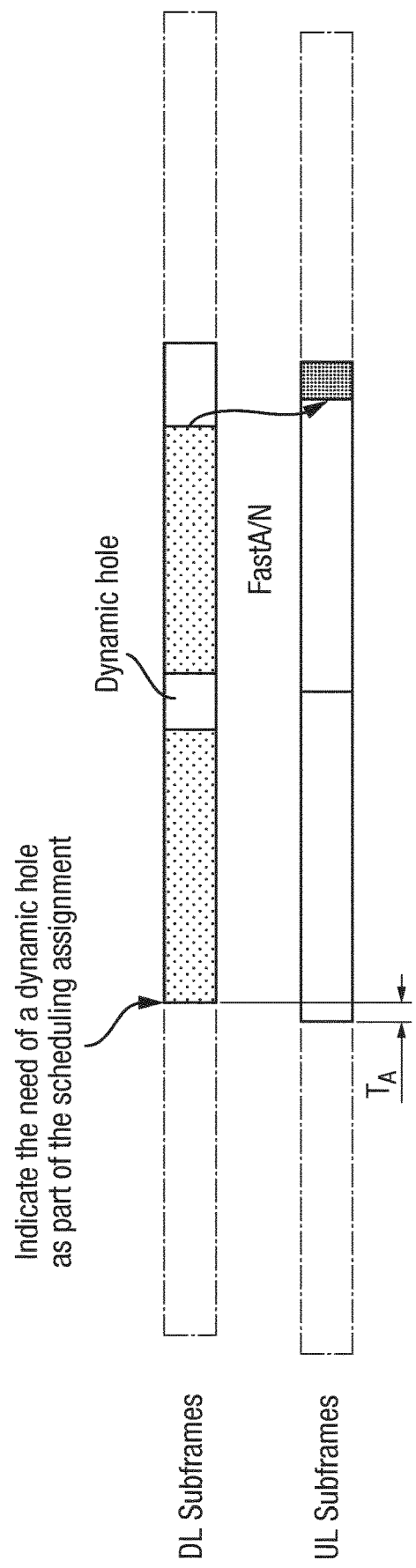

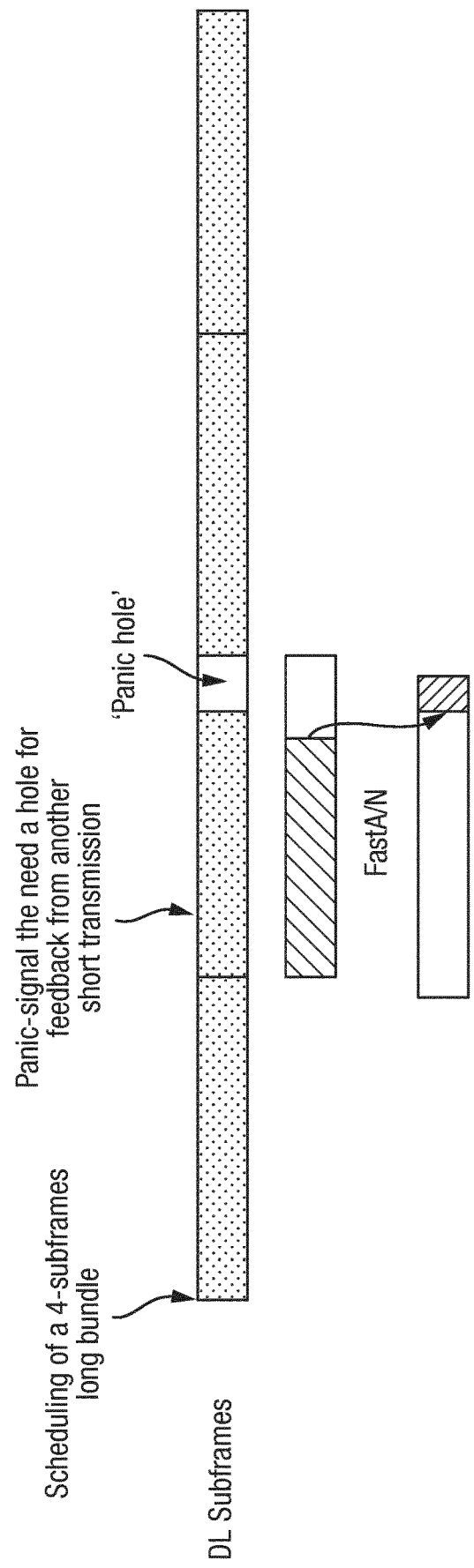

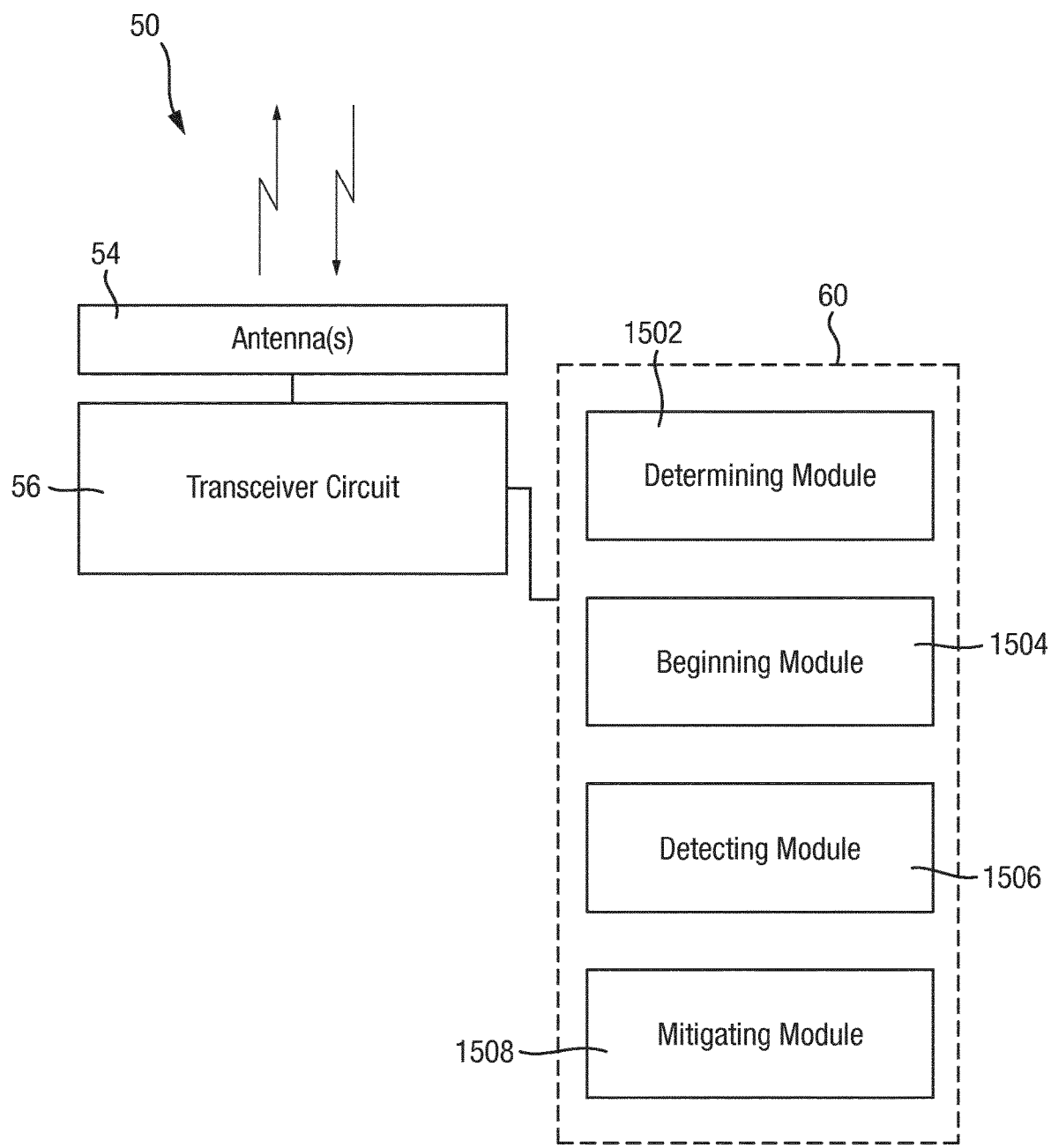

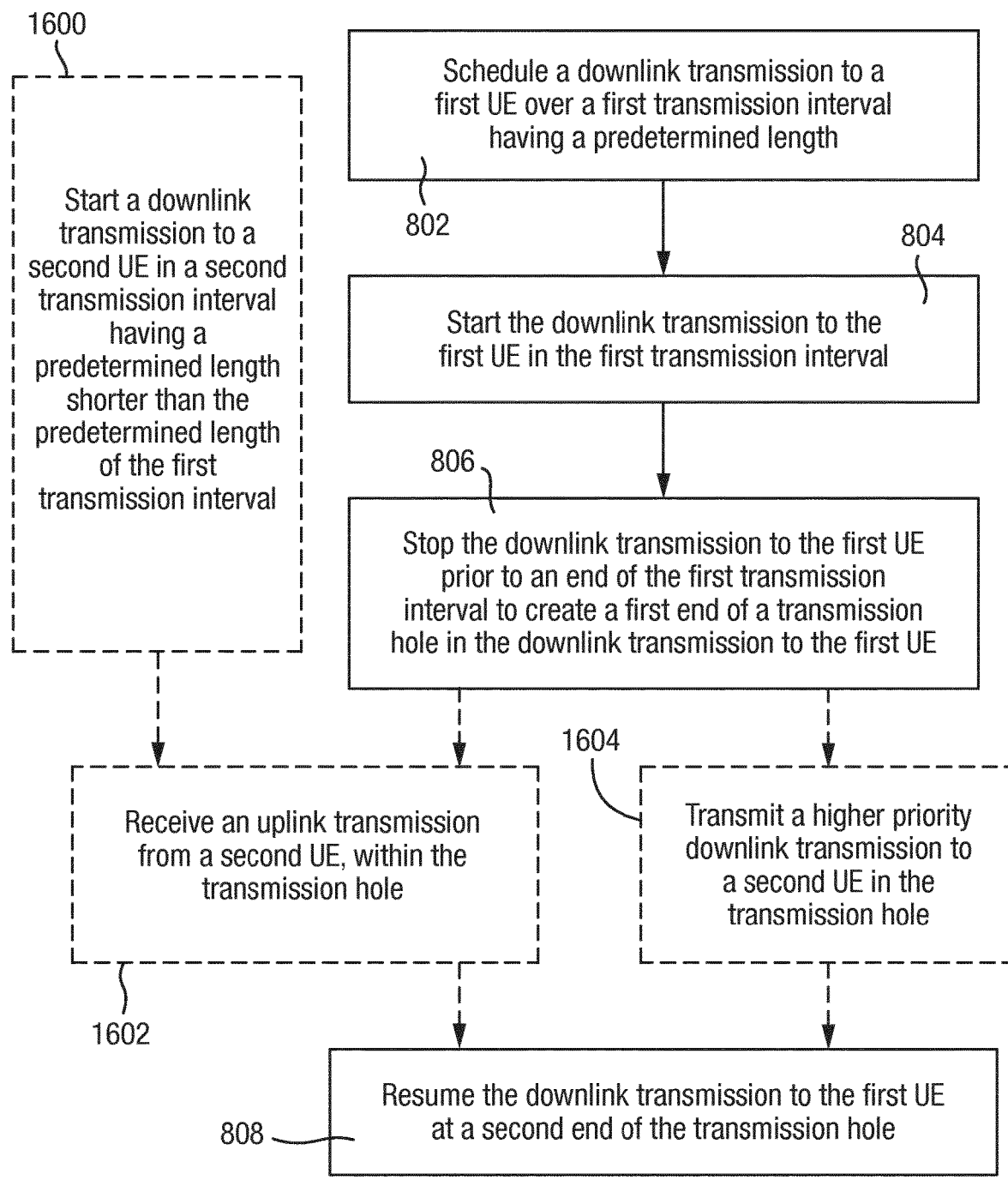

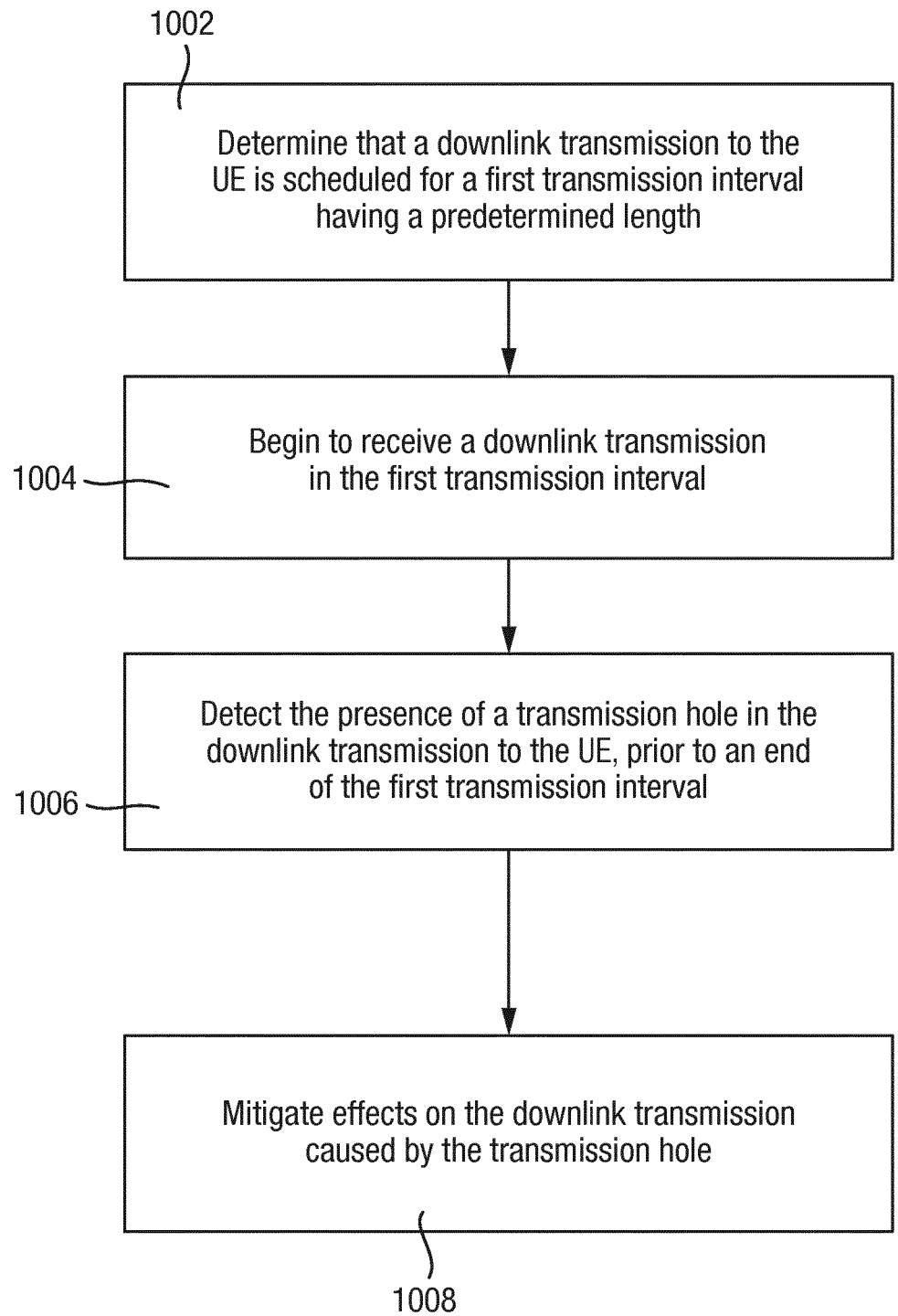

TRANSMISSION HOLES IN LONGER TRANSMISSION INTERVALS

TECHNICAL FIELD

The present disclosure is related to wireless communication systems, and is more particularly related to techniques and apparatus for creating transmission holes in downlink transmissions. The present disclosure is related to a method in a transmitting node and a transmitting node. The present disclosure is also related to a method in a user equipment (UE) and a UE.

BACKGROUND

Long Term Evolution (LTE) wireless communication networks developed by members of the 3rd-Generation Partnership Project (3GPP) use orthogonal frequency-division multiplexing (OFDM) in the downlink and Discrete Fourier Transform spread (DFT-spread) OFDM (also referred to as single-carrier frequency-division multiple access, or SC-FDMA) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

In the time domain, LTE downlink transmissions are organized into radio frames of 10 ms, each radio frame consisting of ten equally-sized subframes of length $T_{subframe}=1$ ms, as shown in FIG. 2. For normal cyclic prefix, one subframe consists of 14 OFDM symbols. The duration of each symbol is approximately 71.4 µs.

While the development and deployment of LTE networks provides users with greatly increased wireless data rates and has enabled the development of a wide variety of mobile broadband (MBB) services, demand for these services continues to grow. In addition to this increased demand for improved bandwidth and performance, new applications for special-purpose devices, such as machine-to-machine (M2M) devices in machine type communications (MTC), continue to be developed. One of the issues with the existing LTE standard is that it uses a fixed large-sized subframe structure, which results in resource wastage for very small-sized data as is often the case in critical MTC (C-MTC) scenarios. These market forces indicate that a wireless communications technology with improved flexibility is needed, to better match the variety of service requirements for mobile data applications.

Accordingly, a highly flexible physical layer is being designed for a future generation of cellular networks, which may be referred to as "5G" networks. This new physical layer design is geared towards fulfilling a wide range of varying requirements including latency, reliability and throughput. Proposed adaptations include using different subcarrier spacing as well as smaller and variable sized subframes in mixed mode operation.

Therefore, 5G networks may be designed to support shorter subframes, such as to allow for very low latency. At the same time, for services not requiring low latency, it can be beneficial to aggregate (or bundle) multiple subframes into a larger time unit or transmission interval, for example as part of the scheduling process.

SUMMARY

The present invention is defined in the independent claims, to which reference is now directed.

One aspect related to low latency is the need for fast feedback, or the ability to obtain uplink feedback once it is ready, even if it is ready before the end of an ongoing scheduled transmission interval. Receiving fast feedback from a second UE may be difficult if a current downlink transmission to a first UE is scheduled over a longer transmission interval, perhaps spanning multiple subintervals (e.g., subframes) of the transmission interval. Accordingly, various embodiments described herein create a transmission "hole" in the scheduled transmission interval of the downlink transmission to allow for feedback uplink transmissions within the transmission hole before resumption and completion of the scheduled longer transmission interval.

According to some embodiments, a method in a transmitting node includes scheduling a downlink transmission to a first user equipment (UE) over a first transmission interval having a predetermined length and starting the downlink transmission to the first UE in the first transmission interval. The method also includes stopping the downlink transmission to the first UE prior to an end of the first transmission interval to create a first end of a transmission hole in the downlink transmission to the first UE and resuming the downlink transmission to the first UE at a second end of the transmission hole. The method may further include receiving an uplink transmission from a second UE, within the transmission hole.

According to some embodiments, a method in a UE includes determining that a downlink transmission to the UE is scheduled for a first transmission interval having a predetermined length and beginning to receive a downlink transmission in the first transmission interval. The method also includes detecting the presence of a transmission hole in the downlink transmission to the UE, prior to an end of the first transmission interval, and mitigating effects on the downlink transmission caused by the transmission hole.

According to some embodiments, a transmitting node includes transceiver circuitry configured to send and receive transmissions and processing circuitry. The processing circuitry is configured, via the transceiver circuitry, to schedule a downlink transmission to a first UE over a first transmission interval having a predetermined length and start the downlink transmission to the first UE in the first transmission interval. The processing circuitry is configured to stop the downlink transmission to the first UE prior to an end of the first transmission interval to create a first end of a transmission hole in the downlink transmission to the first UE. The processing circuitry is further configured to resume the downlink transmission to the first UE at a second end of the transmission hole.

According to some embodiments, a UE includes transceiver circuitry configured to send and receive transmissions and processing circuitry. The processing circuitry is configured, via the transceiver circuitry, to determine that a downlink transmission to the UE is scheduled for a first transmission interval having a predetermined length and begin to receive a downlink transmission in the first transmission interval. The processing circuitry is also configured to detect the presence of a transmission hole in the downlink transmission to the UE, prior to an end of the first transmission interval, and mitigate effects on the downlink transmission caused by the transmission hole.

Other embodiments include computer program products and/or computer readable medium comprising program instructions, when executed by processing circuitry, carry out the above methods.

Of course, embodiments of the present invention are not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 3 illustrates an example of long and short transmission intervals in a mixed mode operation.

FIG. 4 is a diagram illustrating uplink feedback following a downlink transmission.

FIG. 5 is a diagram illustrating the inability to provide fast feedback during a longer downlink transmission.

FIG. 6 is a diagram illustrating a transmission hole in a downlink transmission, according to some embodiments.

FIG. 10 is a flowchart showing a method in a UE for accounting for a transmission hole in a downlink transmission, according to some embodiments.

FIG. 11 is a diagram illustrating a static transmission hole in a downlink transmission, according to some embodiments.

FIG. 12 is a diagram illustrating a dynamic transmission hole in a downlink transmission, according to some embodiments.

FIG. 13 is a diagram illustrating a panic transmission hole in a downlink transmission, according to some embodiments.

FIG. 15 is a functional implementation of a UE, according to some embodiments.

DETAILED DESCRIPTION

Figure 1:
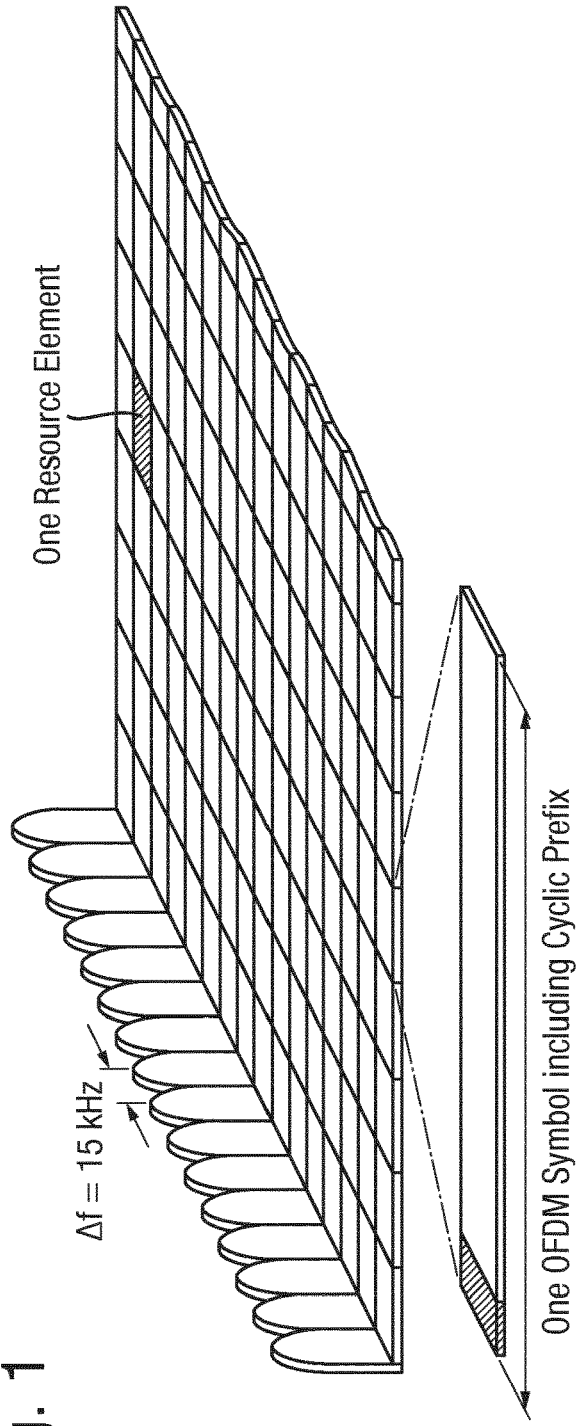
FIG. 1 illustrates a diagram illustrating an LTE downlink physical resource.
Figure 2:
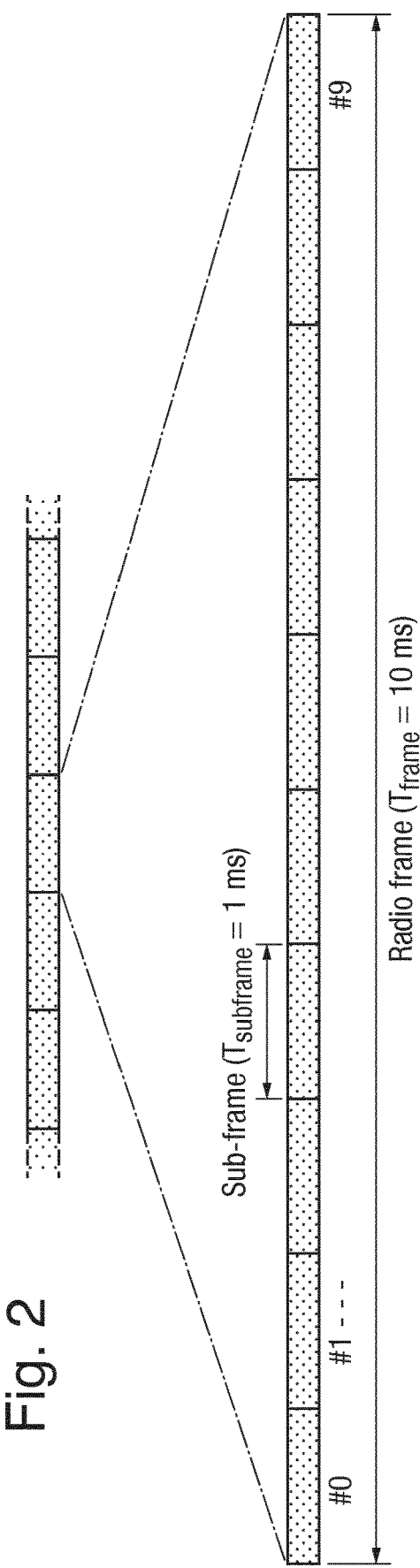
FIG. 2 illustrates a diagram of an LTE time-domain structure.

There can be multiple terminals receiving data simultaneously, resulting in each of these terminals transmitting feedback in the uplink. In a "5G" network, UEs may have different transmission durations or transmission intervals (different bundle sizes, different subframe aggregation levels), with a transmission interval being an interval scheduled for an individual UE. For example, FIG. 3 shows two sizes of transmission intervals, a long transmission interval and shorter transmission intervals. The first UE (UE1), is scheduled with long transmission intervals to support mobile broadband (MBB) traffic, while the second UE (UE2) is scheduled with shorter transmission intervals to support C-MTC traffic.

It may be difficult to obtain feedback quickly from the second UE if a current downlink transmission is scheduled over a longer transmission interval for the first UE. FIG. 4 shows feedback 402 from a UE in an uplink transmission following a downlink transmission with a transmission interval that spans more than one subinterval. For purposes of discussion, a subinterval may be equivalent to a subframe, in many cases. In the example shown by FIG. 5, it will not be possible for a base station not capable of full duplex (either a TDD base station or a half-duplex frequency-division duplex, FDD, base station) to receive the feedback 502 from a second UE with a shorter transmission interval (e.g., one subinterval or one subframe) as the base station is currently transmitting in the downlink to the first UE with a longer transmission interval (e.g., two subintervals or two subframes).

Restricting all UEs to have the same transmission duration would solve this problem, but result in reduced flexibility and potentially increased control signaling overhead also for UEs not requiring very short latency. To be able to receive the uplink feedback 402 from terminals using a short transmission interval (UE #2 in the example in FIG. 4), the base station needs to stop downlink transmission to terminals using a longer transmission interval (UE #1 in FIG. 4) during a (short) period of time. However, stopping at the end of the longer transmission interval will not provide for fast feedback.

Accordingly, various embodiments described herein create a transmission "hole" in the scheduled transmission interval of the downlink transmission to allow for uplink feedback 502 to be received before completion of the scheduled longer transmission interval. The transmission hole will have a first end indicating the start of the hole, or gap in downlink transmission, and a second end indicating the end of the hole and the resumption of the downlink transmission. Such a transmission hole is shown in FIG. 6. In the following description, it is assumed the feedback is in response to a downlink transmission, although other reasons for feedback can be envisioned as well, for example scheduling requests or channel state information (CSI) feedback. Some embodiments provide for the transmission of higher priority or latency sensitive downlink transmissions in the transmission hole created in a downlink transmission interval that was scheduled for a lower priority service. This may apply to FDD and TDD.

Figure 7:
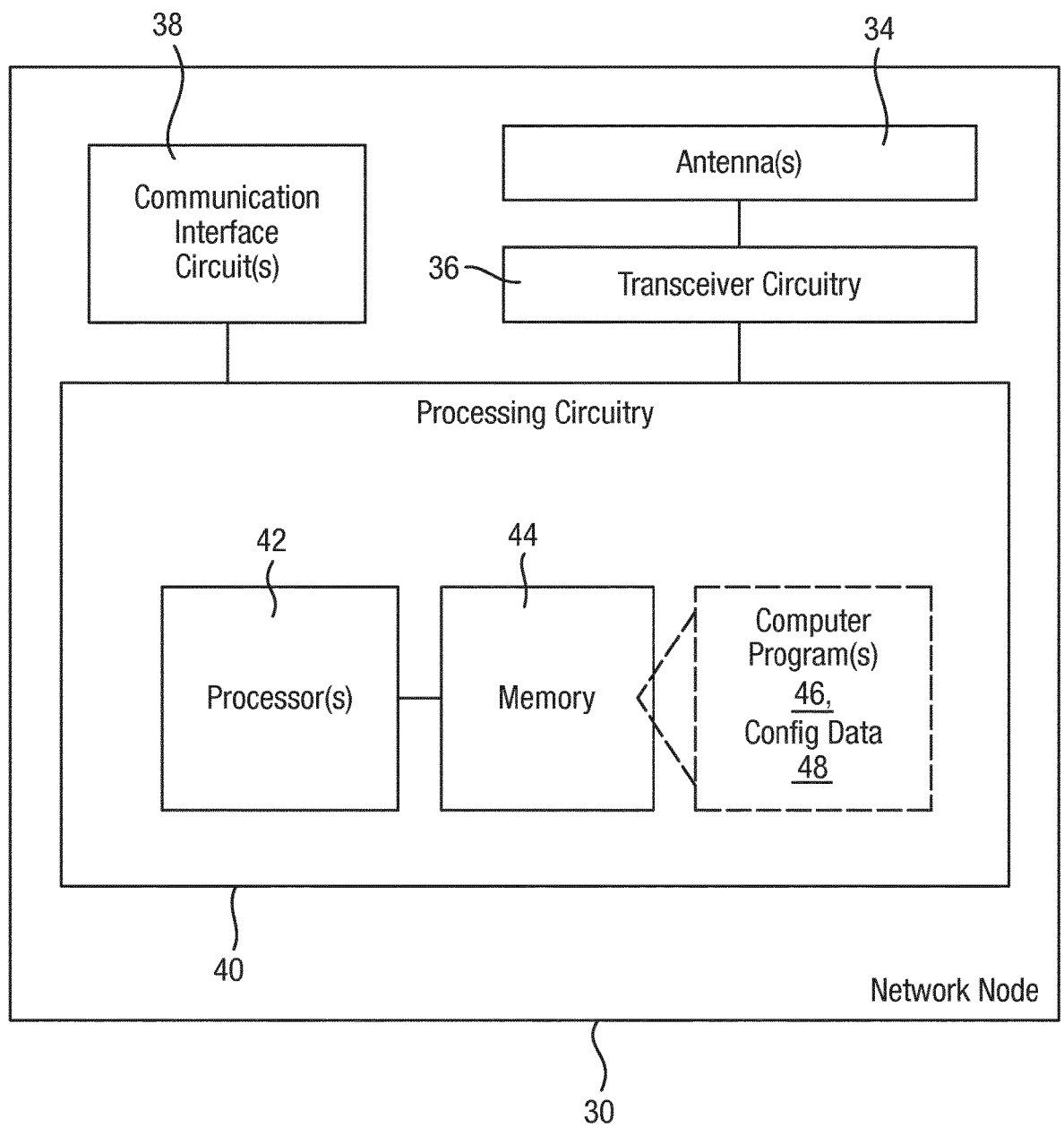
FIG. 7 is a block diagram of a transmitting node, according to some embodiments.

FIG. 7 illustrates a diagram of a transmitting node, such as a radio access network node 30, according to some embodiments. The radio access network node 30 may be a base station or a base station operating in coordination with a base station controller. The network node 30 includes one or more communication interface circuits 38 in order to communicate with network nodes or peer nodes. The network node 30 provides an air interface to wireless devices such as UEs, which is implemented via one or more antennas 34 and transceiver circuitry 36. The transceiver circuitry 36 may include transmitter circuits, receiver circuits, and associated control circuits that are collectively configured to transmit and receive signals according to a radio access technology for the purposes of providing communication services. According to various embodiments, the network node 30 can communicate with one or more peer nodes or core network nodes. The transceiver circuitry 36 is configured to communicate using cellular communication services operated according to wireless communication standards (e.g. GSM, GPRS, WCDMA, HSDPA, LTE, LTE-Advanced, 5G, etc.).

The network node 30 also includes processing circuitry 40 that is operatively associated with the communication interface circuit(s) 38 and/or the transceiver circuitry 36. The processing circuitry 40 comprises one or more digital processors 42, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any combination thereof. More generally, the processing circuitry 40 may comprise fixed circuitry, or programmable circuitry that is specially configured via the execution of program instructions implementing the functionality taught herein, or may comprise some combination of fixed and programmable circuitry. The processor(s) 42 may be multi-core.

The processing circuitry 40 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any combination thereof. By way of non-limiting example, the memory 44 may comprise any one or more of SRAM, DRAM, EEPROM, and FLASH memory, which may be in the processing circuitry 40 and/or separate from the processing circuitry 40. In general, the memory 44 comprises one or more types of computer-readable storage media providing non-transitory storage of the computer program 46 and any configuration data 48 used by the node 30.

The network node 30 is configured for creating and/or using a transmission hole in a downlink transmission. The processing circuitry 40 is configured to use the transceiver circuitry 36 to schedule a downlink transmission to a first UE over a first transmission interval having a predetermined length and start the downlink transmission to the first UE in the first transmission interval. The processing circuitry 40 is also configured to stop the downlink transmission to the first UE prior to an end of the first transmission interval to create a first end of a transmission hole in the downlink transmission to the first UE. The processing circuitry 40 is configured to resume the downlink transmission to the first UE at a second end of the transmission hole. The processing circuitry 40 may use the transceiver circuitry 36 to receive uplink transmissions from another UE within the transmission hole.

In some cases, the network node 30 is configured to perform multicarrier modulation, including using specialized digital hardware for performing Discrete Fourier Transform (DFT)/Inverse DFT (IDFT) processing.

Figure 8:
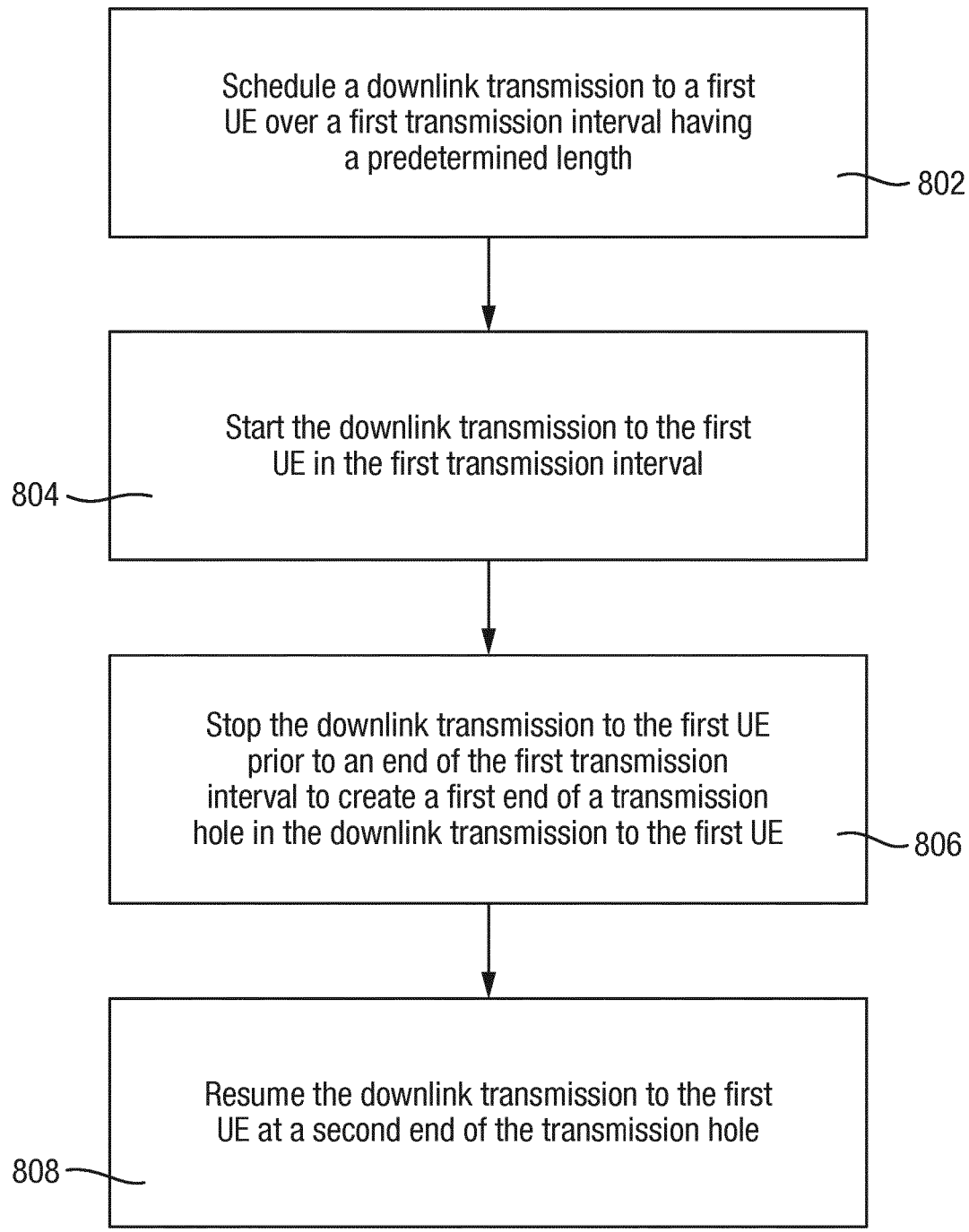
FIG. 8 is a flowchart showing a method in a transmitting node for creating a transmission hole in a downlink transmission, according to some embodiments.

Regardless of the implementation, the processing circuitry 40 is configured to perform operations, as described in the above embodiments. For example, the processing circuitry 40 is configured to perform method 800 illustrated by the flowchart in FIG. 8. The method 800 includes scheduling a downlink transmission to a first UE over a first transmission interval having a predetermined length (Block 802) and starting the downlink transmission to the first UE in the first transmission interval (Block 804). The method also includes stopping the downlink transmission to the first UE prior to an end of the first transmission interval to create a first end of a transmission hole in the downlink transmission to the first UE (Block 806) and resuming the downlink transmission to the first UE at a second end of the transmission hole (Block 808). In various embodiments, the downlink transmission may resume without a detrimental loss of data and/or without requiring retransmission of the longer downlink transmission.

The method 800 may further include receiving an uplink transmission from another UE or transmitting a higher priority downlink transmission to the UE or other UEs, within the transmission hole. In an example, the method 800 includes starting a downlink transmission to a second UE in a second transmission interval having a predetermined length shorter than the predetermined length of the first transmission interval. The second transmission interval may at least partly overlap the first transmission interval. An uplink transmission is received from the second UE in the transmission hole. In some cases, the stopping and the resuming of the downlink transmission to the first UE are performed to align the transmission hole with an end of the second transmission interval.

According to some embodiments, the base station simply stops transmitting in order to create the hole without informing the UEs. This may be considered a blind puncture. From a receiver perspective, this appears as the loss of some of the transmitted bits. If the error-correcting capabilities are sufficiently good (e.g., a low code rate) the receiver may be able to recover from this. However, in many cases this is not possible and the transmission to the first UE might be severely impacted by the hole, causing loss of data (or requiring a retransmission).

The transmitting node or base station may take action to mitigate this impact. According to some embodiments, the stopping and resuming of the downlink transmission may include holding transmission symbols of the downlink transmission for a duration of the transmission hole, and transmitting the held transmission symbols upon resuming the downlink transmission. In other embodiments, the base station mitigates effects of the transmission hole on the downlink transmission by changing a rate matching for the data block to be transmitted, in response to determining that a transmission hole is needed, and mapping remaining data of the downlink transmission in the first transmission interval around the transmission hole.

Figure 9:
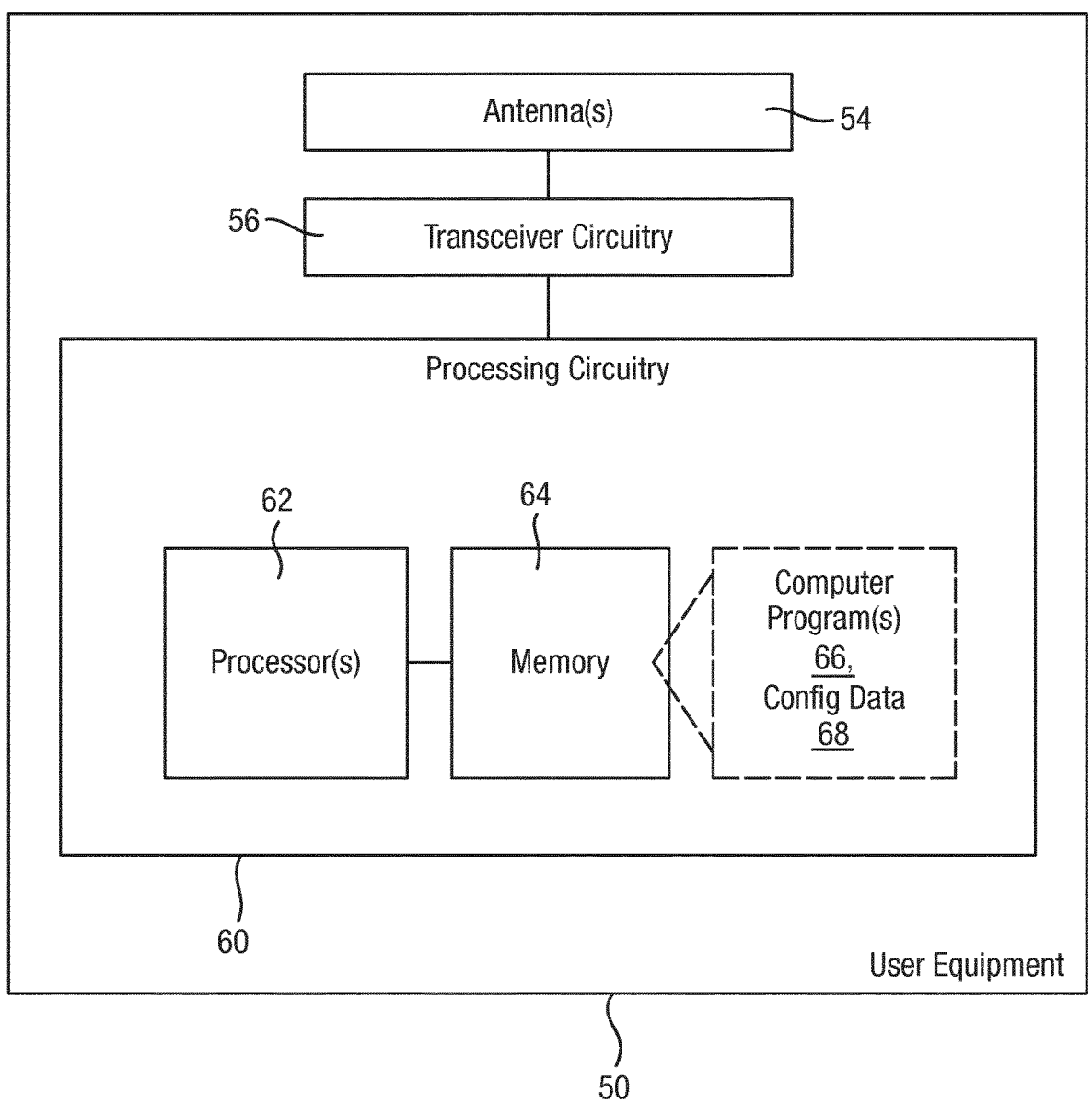
FIG. 9 is a block diagram of a UE, according to some embodiments.

In corresponding fashion, the receiver may try to detect such a puncturing and also take action to mitigate the effects on the transmission hole. FIG. 9 illustrates a diagram of a wireless device, such as UE 50, according to some embodiments. To ease explanation, the user equipment 50 may also be considered to represent any wireless devices that may operate in a network. The UE 50 herein can be any type of wireless device capable of communicating with network node or another UE over radio signals. The UE 50 may also be radio communication device, target device, device to device, D2D, UE, machine type UE or UE capable of machine to machine communication, M2M, a sensor equipped with UE, PDA (personal digital assistant), Tablet, mobile terminals, smart phone, laptop embedded equipped, LEE, laptop mounted equipment, LME, USB dongles, Customer Premises Equipment, CPE, etc.

The UE 50 communicates with a radio access network node or base station, such as the network node 30, via antennas 54 and transceiver circuitry 56. The transceiver circuitry 56 may include transmitter circuits, receiver circuits, and associated control circuits that are collectively configured to transmit and receive signals according to a radio access technology, for the purposes of providing cellular communication services.

The UE 50 also includes processing circuitry 60 that is operatively associated with the radio transceiver circuitry 56. The processing circuitry 60 comprises one or more digital processing circuits 62, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuitry 60 may comprise fixed circuitry, or programmable circuitry that is specially adapted via the execution of program instructions implementing the functionality taught herein, or may comprise some mix of fixed and programmed circuitry. The processing circuitry 60 may be multi-core.

The processing circuitry 60 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuitry 60 and/or separate from processing circuitry 60. In general, the memory 64 comprises one or more types of computer-readable storage media providing non-transitory storage of the computer program 66 and any configuration data 68 used by the user equipment 50.

The UE 50 is configured to account for effects of a transmission hole experienced in a downlink transmission to the UE. For example, the processing circuitry 60 may execute a computer program 66 stored in the memory 64 that configures the processing circuitry 60 to use transceiver circuitry 56 to determine that a downlink transmission to the UE is scheduled for a first transmission interval having a predetermined length, and to begin to receive a downlink transmission in the first transmission interval. The processing circuitry 60 is also configured to detect the presence of a transmission hole in the downlink transmission to the UE, prior to an end of the first transmission interval, and mitigate effects on the downlink transmission caused by the transmission hole.

The processing circuitry 60 of the UE 50 is also configured to perform a method, such as method 1000 of FIG. 10. The method 1000 includes determining that a downlink transmission to the UE is scheduled for a first transmission interval having a predetermined length (Block 1002) and beginning to receive a downlink transmission in the first transmission interval (Block 1004). The method 1000 also includes detecting the presence of a transmission hole in the downlink transmission to the UE, prior to an end of the first transmission interval (Block 1004) and mitigating effects on the downlink transmission caused by the transmission hole (Block 1006).

While the UE 50 is given as an example of a receiver, and the network node 30 is given as an example of a transmitting node, the techniques could more generally be applied in any direction, between any two radio nodes.

Detection of a transmission hole may be based on monitoring channel estimates or a change in pilot signals. For example, if a new transmission replaces the original then pilot transmissions will change and channel estimates will change abruptly. A hole may be detected when pilots are not transmitted where the UE expects or because a UE to UE channel is different than an eNB to UE channel. A transmission hole may also be detected based on signaling included in or associated with the downlink transmission.

Mitigation of the effects of the transmission hole may include changing filter settings for channel tracking. Mitigation may also include changing a rate matching for the data block received in the first transmission interval, in response to detecting the presence of the transmission hole, and decoding the data block using data symbols received in the first transmission interval, before and after the transmission hole. In other cases, mitigation includes setting soft values of coded bits for channel decoding to zero, for one or more symbol times corresponding to the transmission hole.

A base station may predetermine where transmission holes may occur in a downlink transmission. In some cases, the base station leaves the last part of each downlink subinterval of the transmission interval unused even if the subinterval is part of a transmission using an aggregation of subintervals. For example, in the static transmission hole scenario shown in FIG. 11, there is always a hole in case there is a UE transmitting feedback. The base station, and possible the receiver, can account for such transmission holes.

In various embodiments, the first transmission interval may include two or more subintervals of a predetermined, fixed duration, e.g., where a single subinterval corresponds to the smallest interval that can be scheduled for any UEs supported by the system. Again, a subframe will be used as an example subinterval of the transmission interval, but a subinterval is not meant to be limited to a subframe. While a first transmission interval may include multiple subintervals, called subframes hereafter, or a subframe bundle, a second transmission interval for transmissions to a second UE may include only one subframe, or fewer or smaller subframes than of the first transmission interval. In some cases, the transmission hole in the first transmission interval is prior to or immediately after an end of the second transmission interval. The stopping and resuming of the downlink transmission to the first UE may be performed to align the transmission hole with an end of the second transmission interval.

According to other embodiments, semi-static holes may be used. These embodiments are an extension of the static hole embodiments. Instead of having a hole at the end of each subframe, the system can configure holes in only every second, third, fourth . . . n subframe. In other words, subframes may in general follow a (fixed or configurable) pattern. If multiple UEs are scheduled simultaneously, this would require the single-subframe transmissions to start on every second, third, fourth . . . n subframe only in order to exploit the presence of a transmission hole for the feedback.

Transmission holes may also be scheduled on a dynamic basis, as shown by FIG. 12 according to some embodiments. For example, the scheduling assignment for a multi-subframe transmission contains transmission hole information on whether to create transmission holes, and if so, in which of the subframes and/or where. The dynamic signaling could directly indicate the holes, e.g. by having a flag whether to assume a hole at the end of each subframe or a bitmap indicating the subframes in the transmission interval or subframe bundle where a hole should be assumed. Alternatively, the dynamic signaling could be used as a pointer into a set of static or semi-statically configured 'hole patterns', e.g. 00=no holes, 01=hole in the first subframe of the transmission interval, 10=hole in every subframe in the transmission interval. According to some embodiments, transmission hole information is received specifically defining the first and second ends of the transmission hole. The stopping and resuming of the downlink transmission are then performed according to the transmission hole information.

FIG. 13 illustrates the scenario of a "panic hole". In some of the previous embodiments, the need for a transmission hole is known when scheduling the long first transmission interval. However, this may not always be the case. This can be addressed by having a mechanism to dynamically create panic holes during an ongoing transmission. This can be done, for example, by transmitting information on the need for a panic hole to the UE(s) with currently ongoing transmissions. The need to monitor for a panic signal could in principle be provided in the scheduling assignment if additional flexibility is needed.

Creating a 'panic hole' may, depending on the detailed transmission structure, impact the reception of data similar to blind puncturing. However, if the retransmission protocol is such that only parts of the data, e.g. the part lost due to the panic hole, needs to be retransmitted the impact may not be that severe. The panic hole may also be taken into account on both the transmitter and receiver side if it is known to both sides. To account for the panic hole, the rate matching may be changed and the remaining data mapped around the panic hole instead of simply puncturing the downlink transmission with the panic hole. Another possibility is to counteract the hole by "delaying"' the ongoing transmission, or symbols in the transmission, by the duration of the panic hole. For example, the part of the transmission that would be transmitted in the interval $[t_1, t_{end}]$ in absence of a hole at $t_1$ is instead transmitted during the interval $[t_1+T_{hole}, t_{end}+T_{hole}]$.

Transmission hole information, including information regarding panic holes, may be signaled on the downlink control channel. This requires that the UE monitors the downlink control channel while receiving data. The control channel may or may not be within the resources originally allocated for data.

Figure 16:
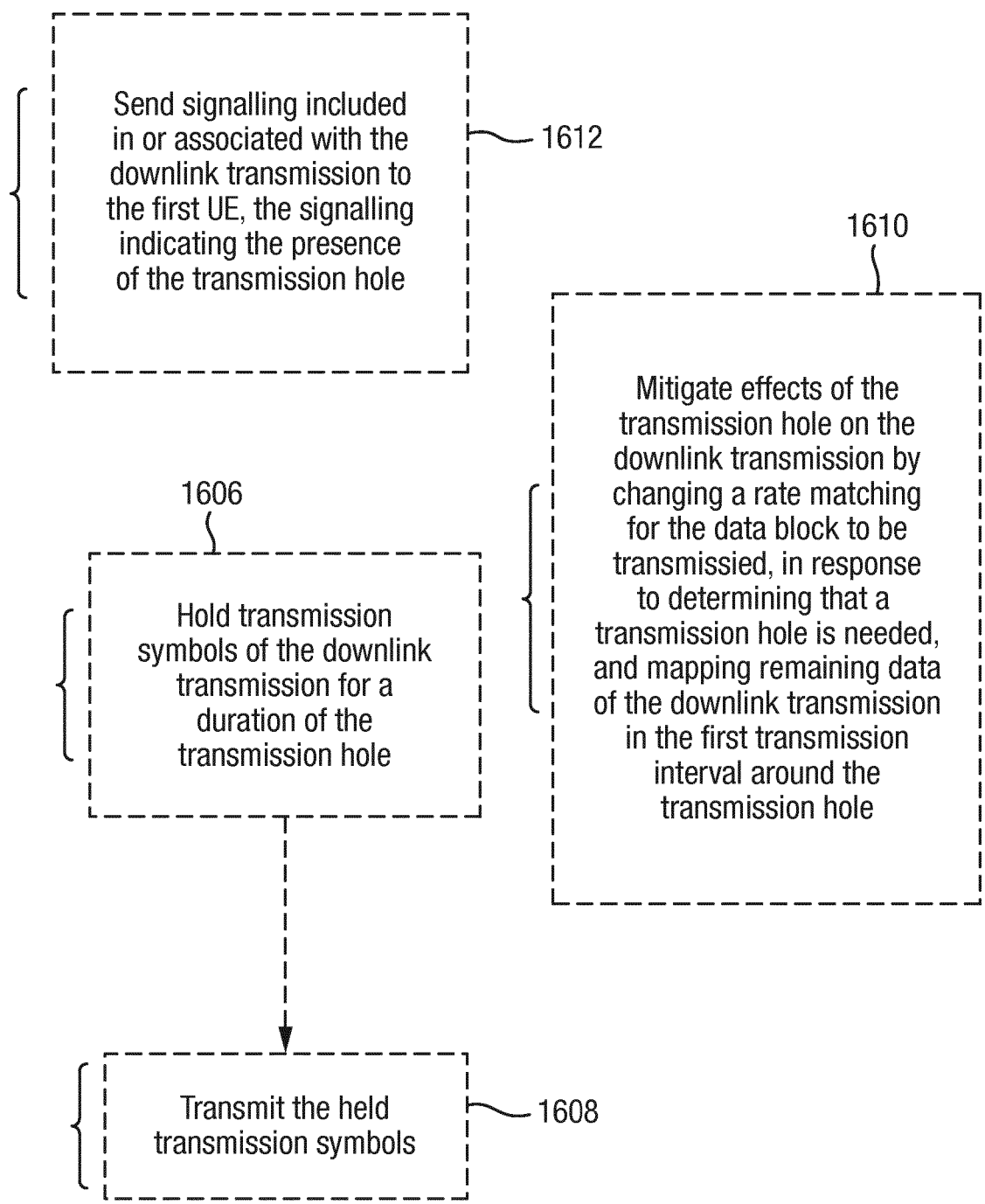
FIG. 16 is a flow chart showing a method in a transmitting node, according to some preferred embodiments.

FIG. 16 is a flow chart showing a method in a transmitting node according to some preferred embodiments of the present invention. The method comprises at 802 scheduling a downlink transmission to a first user equipment (UE) over a first transmission interval having a predetermined length. This may comprise sending a scheduling assignment to the first UE. The method further comprises at 804 starting the downlink transmission to the first UE in the first transmission interval, and at 806 stopping the downlink transmission to the first UE prior to an end of the first transmission interval to create a first end of a transmission hole in the downlink transmission to the first UE. The method further comprises at 808 resuming the downlink transmission to the first UE at a second end of the transmission hole.

The method may further comprise at 1602 receiving an uplink transmission from a second UE, within the transmission hole. More particularly the method may comprise at 1600 starting a downlink transmission to a second UE in a second transmission interval having a predetermined length shorter than the predetermined length of the first transmission interval, wherein the second transmission interval at least partly overlaps the first transmission interval, and at 1602 receiving an uplink transmission from the second UE in the transmission hole. In some embodiments the method may comprise at 1600 starting downlink transmission to a second UE in a second transmission interval having a predetermined length shorter than the predetermined length of the first transmission interval, and the stopping 806 and the resuming 808 of the downlink transmission may be performed to align the transmission hole with an end of the second transmission interval. In some embodiments the first transmission interval may comprise two or more subintervals of a predetermined, fixed duration. In this case, by way of example, the second transmission interval may have a predetermined length of one subinterval, and the transmission hole may be prior to or immediately after an end of the second transmission interval.

Alternatively, the method may comprise at 1604 transmitting a higher priority downlink transmission to a second UE in the transmission hole.

In some embodiments (not shown in FIG. 16) the method may comprise receiving transmission hole information defining the first and second ends of the transmission hole, and performing the stopping 806 and the resuming 808 of the downlink transmission according to the transmission hole information. For example, in embodiments where the first transmission interval comprises two or more subintervals of a predetermined, fixed duration, the transmission hole information may define which of the two or more subintervals of the first transmission interval will have a transmission hole. The transmission hole information may be a dynamically signaled flag or bitmap.

In some embodiments, where the first transmission interval comprises two or more subintervals of a predetermined, fixed duration, the stopping 806 and the resuming 808 of the downlink transmission may be performed to create a transmission hole in the downlink transmission to the first UE in each of the two or more subintervals. However, other embodiments are possible, as for example discussed above.

Further, the stopping 806 and resuming 808 the downlink transmission to the first UE may comprise 1606 holding transmission symbols of the downlink transmission for a duration of the transmission hole, and 1608 transmitting the held transmission symbols upon resuming the downlink transmission. In addition, or alternatively, the method may further comprise 1610 mitigating effects of the transmission hole on the downlink transmission by changing a rate matching for the data block to be transmitted, in response to determining that a transmission hole is needed, and mapping remaining data of the downlink transmission in the first transmission interval around the transmission hole.

In preferred embodiments the method may further advantageously comprise at 1612 sending signaling included in or associated with the downlink transmission to the first UE, the signaling indicating the presence of the transmission hole. For example, the signaling may comprise transmission hole information, such as a flag or bitmap or pointer into a set of static or semi-statically configured hole patterns. The transmission hole information may be included in the scheduling assignment sent to the first UE to schedule the downlink transmission. Alternatively, the transmission hole information could, for example, be signaled on a downlink control channel.

Figure 17:
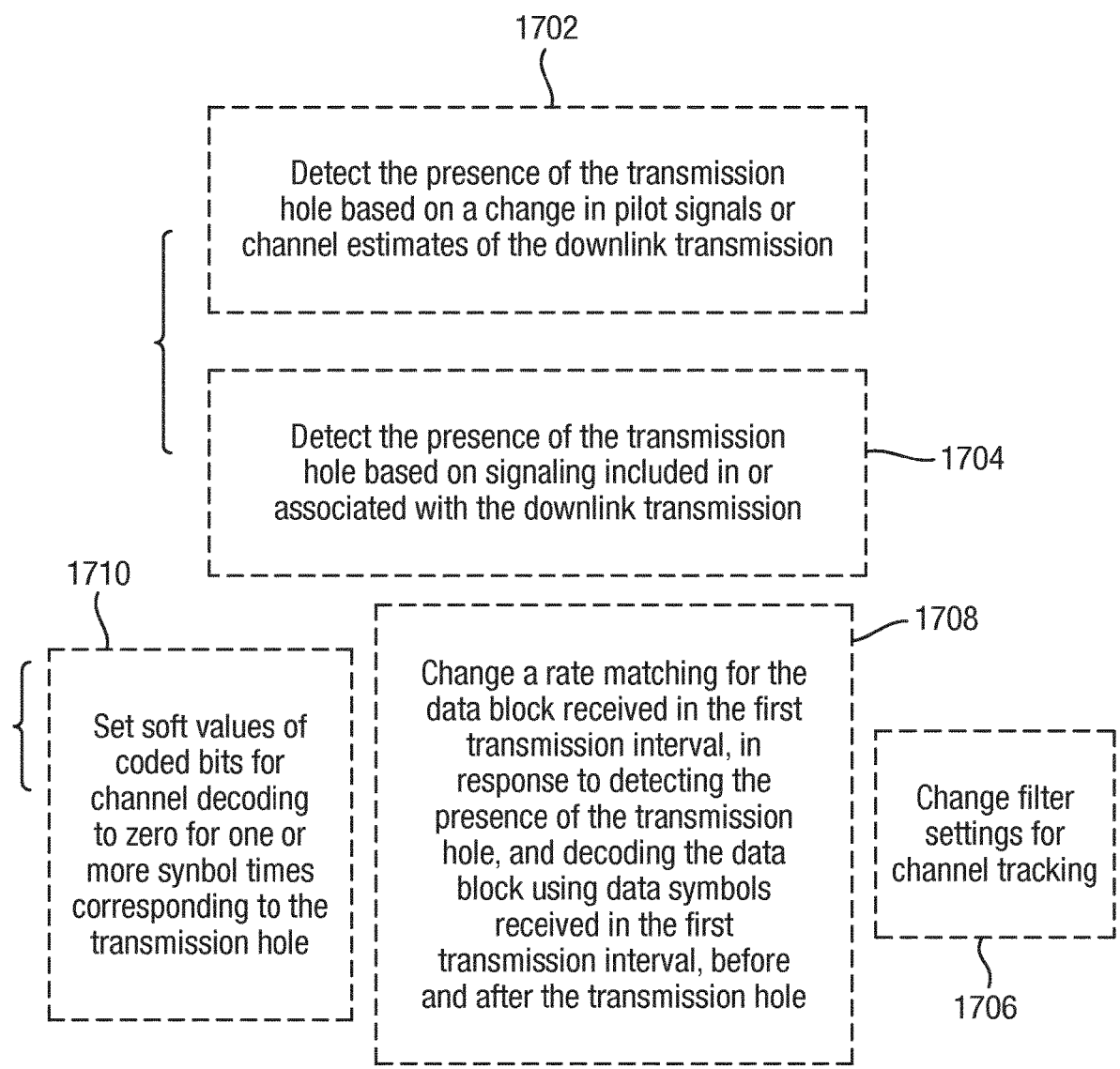
FIG. 17 is a flow chart showing a method in a UE, according to some preferred embodiments.

FIG. 17 is a flow chart showing a method in a user equipment (UE) according to some preferred embodiments of the present invention. The method comprises at 1002 determining that a downlink transmission to the UE is scheduled for a first transmission interval having a predetermined length. This may comprise receiving a scheduling assignment. The method further comprises at 1004 beginning to receive a downlink transmission in the first transmission interval. The method further comprises at 1006 detecting the presence of a transmission hole in the downlink transmission to the UE, prior to an end of the first transmission interval, and at 1008 mitigating effects on the downlink transmission caused by the transmission hole. Note that the detecting 1006 may occur before, after or simultaneously to the UE beginning to receive the downlink transmission at 1004.

In some embodiments, the detecting 1006 the presence of a transmission hole may comprise detecting 1702 the presence of the transmission hole based on a change in pilot signals or channel estimates of the downlink transmission. Alternatively, the detecting 1006 the presence of a transmission hole may comprise detecting 1704 the presence of the transmission hole based on signaling included in or associated with the downlink transmission. In this case, the detecting 1704 may thus comprise receiving signaling included in or associated with the downlink transmission, the signaling indicating the presence of the transmission hole.

In some embodiments, mitigating 1008 effects on the downlink transmission may comprise 1706 changing filter settings for channel tracking. Mitigating 1008 effects on the downlink transmission may alternatively comprise 1708 changing a rate matching for the data block received in the first transmission interval, in response to detecting the presence of the transmission hole, and decoding the data block using data symbols received in the first transmission interval, before and after the transmission hole. Mitigating 1008 effects on the downlink transmission may alternatively comprise 1710 setting soft values of coded bits for channel decoding to zero, for one or more symbol times corresponding to the transmission hole. Other embodiments are possible and will occur to those skilled in the art. Thus, the UE may account for effects of the transmission hole.

As explained above with respect to FIG. 7, according to embodiments, a transmitting node 30 comprises transceiver circuitry 36 configured to send and receive transmissions; and processing circuitry 40. The processing circuitry 40 is configured via the transceiver circuitry to: schedule a downlink transmission to a first user equipment (UE) over a first transmission interval having a predetermined length; start the downlink transmission to the first UE in the first transmission interval; stop the downlink transmission to the first UE prior to an end of the first transmission interval to create a first end of a transmission hole in the downlink transmission to the first UE; and resume the downlink transmission to the first UE at a second end of the transmission hole.

The processing circuitry 40 may advantageously further be configured to send signaling included in or associated with the downlink transmission to the first UE, the signaling indicating the presence of the transmission hole.

The processing circuitry 40 may further be configured to receive an uplink transmission from a second UE, within the transmission hole. The processing circuitry 40 may be configured to: start a downlink transmission to a second UE in a second transmission interval having a predetermined length shorter than the predetermined length of the first transmission interval, wherein the second transmission interval at least partly overlaps the first transmission interval; and receive an uplink transmission from the second UE in the transmission hole. The processing circuitry 40 may be configured to: start downlink transmission to a second UE in a second transmission interval having a predetermined length shorter than the predetermined length of the first transmission interval; and stop and resume the downlink transmission are performed to align the transmission hole with an end of the second transmission interval.

The processing circuitry 40 may alternatively be configured to transmit a higher priority downlink transmission to a second UE in the transmission hole.

In some embodiments, the processing circuitry 40 may be configured to: receive transmission hole information defining the first and second ends of the transmission hole; and stop and resume the downlink transmission according to the transmission hole information.

The first transmission interval may comprise two or more subintervals of a predetermined, fixed duration. In this case, the processing circuitry 40 may be configured to: start downlink transmission to a second UE in a second transmission interval having a predetermined length of one subinterval; and receive an uplink transmission from the second UE in the transmission hole, wherein the transmission hole is prior to or immediately after an end of the second transmission interval. The processing circuitry 40 may be configured to: receive transmission hole information defining which of the two or more subintervals of the first transmission interval will have a transmission hole; and stop and resume the downlink transmission according to the transmission hole information. The transmission hole information may be a dynamically signaled flag or bitmap. In some embodiments the processing circuitry 40 may be configured to stop and resume the downlink transmission to create a transmission hole in the downlink transmission to the first UE in each of the two or more subintervals.

In some embodiments, the processing circuitry 40 may be configured to hold transmission symbols of the downlink transmission for a duration of the transmission hole, and transmit the held transmission symbols upon resuming the downlink transmission.

In some embodiments, the processing circuitry 40 may be configured to mitigate effects of the transmission hole on the downlink transmission by changing a rate matching for the data block to be transmitted, in response to determining that a transmission hole is needed, and mapping remaining data of the downlink transmission in the first transmission interval around the transmission hole.

Further, as explained above with respect to FIG. 9, according to embodiments, a user equipment (UE), 50 comprises transceiver circuitry 56 configured to send and receive transmissions, and processing circuitry 60. The processing circuitry 60 is configured via the transceiver circuitry 56 to: determine that a downlink transmission to the UE is scheduled for a first transmission interval having a predetermined length; begin to receive a downlink transmission in the first transmission interval; detect the presence of a transmission hole in the downlink transmission to the UE, prior to an end of the first transmission interval; and mitigate effects on the downlink transmission caused by the transmission hole.

The processing circuitry 60 may be configured to detect the presence of the transmission hole based on a change in pilot signals or channel estimates of the downlink transmission. Alternatively, the processing circuitry 60 may be configured to detect the presence of the transmission hole based on signaling included in or associated with the downlink transmission.

The processing circuitry 60 may be configured to mitigate effects on the downlink transmission by changing filter settings for channel tracking. The processing circuitry 60 may be configured to mitigate effects on the downlink transmission by changing a rate matching for the data block received in the first transmission interval, in response to detecting the presence of the transmission hole, and decoding the data block using data symbols received in the first transmission interval, before and after the transmission hole. The processing circuitry 60 may be configured to mitigate effects on the downlink transmission by setting soft values of coded bits for channel decoding to zero, for one or more symbol times corresponding to the transmission hole.

According to some embodiments, there is further provided a computer program product comprising program instructions for a processor in a transmitting node, wherein said program instructions are configured so as to cause the transmitting node, when the program instructions are executed by the processor, to: schedule a downlink transmission to a first user equipment (UE) over a first transmission interval having a predetermined length; start the downlink transmission to the first UE in the first transmission interval; stop the downlink transmission to the first UE prior to an end of the first transmission interval to create a first end of a transmission hole in the downlink transmission to the first UE; and resume the downlink transmission to the first UE at a second end of the transmission hole.

A non-transitory computer-readable medium may comprise, stored thereupon, the computer program product.

According to some embodiments there is further provided a computer program product comprising program instructions for a processor in a user equipment (UE), wherein said program instructions are configured so as to cause the UE, when the program instructions are executed by the processor, to: determine that a downlink transmission to the UE is scheduled for a first transmission interval having a predetermined length; begin to receive a downlink transmission in the first transmission interval; detect the presence of a transmission hole in the downlink transmission to the UE, prior to an end of the first transmission interval; and mitigate effects on the downlink transmission caused by the transmission hole.

A non-transitory computer-readable medium may comprise, stored thereupon, the computer program product.

In the present disclosure, the non-limiting term radio network node or simply the network node 30 may be used. It refers to any type of network node that serves UE and/or connected to other network node or network element or any radio node from where UE receives signal. Examples of various types of radio network nodes are Node B, base station (BS), multi-standard radio (MSR) node such as MSR BS, eNode B, network controller, radio network controller (RNC), base station controller (BSC), relay, donor node or controlling relay, base transceiver station (BTS), access point (AP), transmission points, transmission nodes, RRU, RRH, nodes in distributed antenna system (DAS), etc. The non-limiting terms user equipment (UE) or mobile terminal may also be used. These terms refer to any type of wireless device that communicates with a radio network node in a cellular or mobile communication system. Examples of UE are target device, device to device (D2D) UE, machine type UE or UE capable of machine-to-machine (M2M) communication, PDA, Tablet, mobile terminals, smart phone, laptop-embedded equipped (LEE), laptop-mounted equipment (LME), USB dongles, etc. It should be understood that the term mobile terminal is meant to refer to any and all of these access terminal types, some of which may be fixed in a given location. Thus, a mobile terminal is not necessarily "mobile."

Although the techniques and apparatus described herein are expected to be used in 5G systems, terminology used in the specification of LTE systems may be used herein, for convenience. It will be understood that other names may apply to the same or similar parameters, channels, etc. It should also be appreciated that the techniques and apparatus described herein may be designed for backwards compatibility with LTE and/or other systems, but are not necessarily so. Embodiments of the presently disclosed techniques and apparatus are applicable also to single-carrier as well as to multicarrier (MC) or carrier aggregation (CA) operation of the UE.

Figure 14:
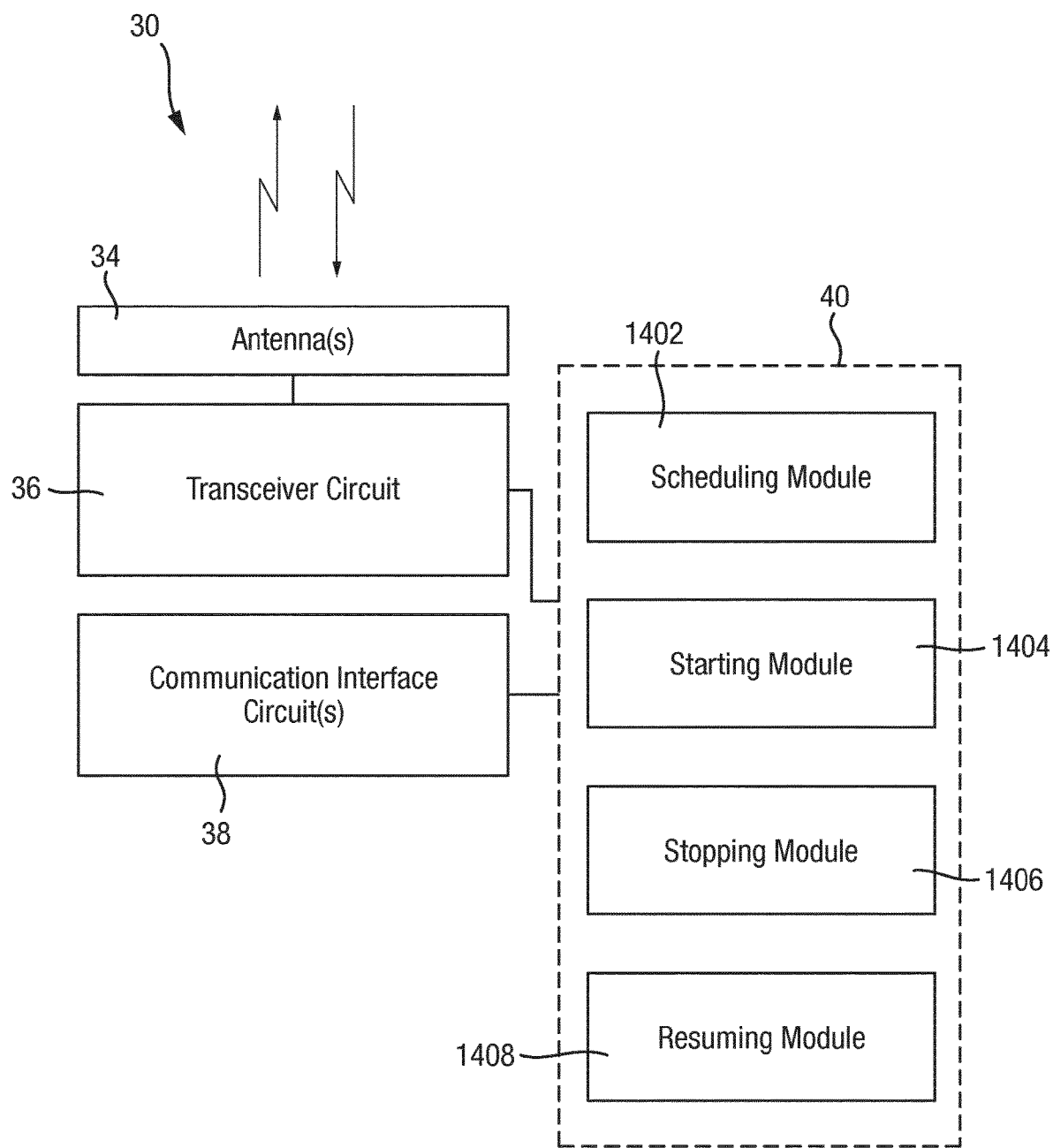
FIG. 14 is a functional implementation of a transmitting node, according to some embodiments.

FIG. 14 illustrates an example functional module or circuit architecture as may be implemented in a transmitting node, such as network node 30, e.g., based on the processing circuitry 40. The illustrated embodiment at least functionally includes a scheduling module 1402 for scheduling a downlink transmission to a first UE over a first transmission interval having a predetermined length and a starting module 1404 for starting the downlink transmission to the first UE in the first transmission interval. The implementation also includes a stopping module 1406 for stopping the downlink transmission to the first UE prior to an end of the first transmission interval to create a first end of a transmission hole in the downlink transmission to the first UE, and a resuming module 1408 for resuming the downlink transmission to the first UE at a second end of the transmission hole.

FIG. 15 illustrates an example functional module or circuit architecture as may be implemented in a receiver or wireless terminal, such as UE 50, e.g., based on the processing circuitry 60. The illustrated embodiment at least functionally includes a determining module 1501 for determining that a downlink transmission to the UE is scheduled for a first transmission interval having a predetermined length, and a beginning module 1502 for beginning to receive a downlink transmission in the first transmission interval. The implementation also includes a detecting module 1504 for detecting the presence of a transmission hole in the downlink transmission to the UE, prior to an end of the first transmission interval and a mitigating module 1506 for mitigating effects on the downlink transmission caused by the transmission hole.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in a transmitting node of a communication network, the method comprising:
   scheduling a downlink transmission to a first user equipment (UE) according to a Fifth Generation (5G) radio access technology (RAT), over a first transmission interval having a predetermined length, wherein the first transmission interval comprises two or more sub-intervals of a predetermined, fixed duration, each sub-interval corresponding to the smallest interval that can be scheduled for a UE supported by the 5G RAT, and wherein the scheduling comprises sending a scheduling assignment to the first UE for the downlink transmission;
   starting the downlink transmission to the first UE in the first transmission interval;
   stopping the downlink transmission to
      the first UE prior to an end of the first transmission interval, to create a first end of a transmission hole in the downlink transmission to the first UE;
   resuming the downlink transmission to the first UE at a second end of the transmission hole; and
   receiving an uplink transmission from a second UE, within the transmission hole according to the 5G RAT, or transmitting a higher priority downlink transmission to the second UE in the transmission hole, according to the 5G RAT.

2. The method of claim 1, wherein, in association with receiving the uplink transmission from the second UE within the transmission hole, the method further comprises starting a downlink transmission to the second UE in a second transmission interval having a predetermined length shorter than the predetermined length of the first transmission interval, wherein the second transmission interval at least partly overlaps the first transmission interval.

3. The method of claim 1, wherein, in association with receiving the uplink transmission from the second UE within the transmission hole, the method further comprises starting a downlink transmission to the second UE in a second transmission interval having a predetermined length of one subinterval, and wherein the transmission hole is prior to or immediately after an end of the second transmission interval.

4. The method of claim 1, wherein the stopping and the resuming of the downlink transmission are performed to create the transmission hole in the downlink transmission to the first UE in each of the two or more subintervals.

5. The method of claim 1, wherein the stopping and the resuming of the downlink transmission to the first UE comprises holding transmission symbols of the downlink transmission for a duration of the transmission hole, and transmitting the held transmission symbols upon resuming the downlink transmission.

6. The method of claim 1, wherein the method further comprises mitigating effects of the transmission hole on the downlink transmission by changing a rate matching for a data block to be transmitted, in response to determining that the transmission hole is needed, and mapping remaining data of the downlink transmission in the first transmission interval around the transmission hole.

7. The method of claim 1, further comprising sending signaling included in or associated with the downlink transmission to the first UE, the signaling indicating the presence of the transmission hole.

8. A method in a communication network comprising a first user equipment (UE), a second UE, and a transmitting node, the method comprising:
at the first UE:
determining that a downlink transmission to the first UE from the transmitting node is scheduled according to a Fifth Generation (5G) radio access technology (RAT), for a first transmission interval having a predetermined length, wherein the first transmission interval comprises two or more subintervals having a predetermined, fixed duration, each subinterval corresponding to the smallest interval that can be scheduled for a UE supported by the 5G RAT, and wherein determining that the downlink transmission to the first UE is scheduled comprises the first UE receiving a scheduling assignment for the downlink transmission;
beginning to receive the downlink transmission in the first transmission interval from the transmitting node; and
detecting the presence of a transmission hole in the downlink transmission, prior to an end of the first transmission interval; and
at the second UE:
transmitting an uplink transmission to the transmitting node within the transmission hole, according the 5G RAT, or receiving a higher priority downlink transmission from the transmitting node in the transmission hole, according to the 5G RAT.

9. The method of claim 8, wherein detecting the presence of the transmission hole comprises at least one of: detecting the presence of the transmission hole based on a change in pilot signals or channel estimates of the downlink transmission; or detecting the presence of the transmission hole based on signaling included in or associated with the downlink transmission.

10. The method of claim 8, wherein the method further comprises, at the first UE, mitigating effects of the transmission hole on the downlink transmission by at least one of: changing filter settings used for channel tracking; changing a rate matching for a data block received in the first transmission interval, in response to detecting the presence of the transmission hole, or decoding the data block using data symbols received in the first transmission interval, before and after the transmission hole; or setting soft values of coded bits for channel decoding to zero, for one or more symbol times corresponding to the transmission hole.

11. A transmitting node configured for operation in a communication network, the transmitting node comprising:
transceiver circuitry configured to send and receive transmissions; and
processing circuitry configured via the transceiver circuitry to:
schedule a downlink transmission to a first user equipment (UE) according to a Fifth Generation (5G) radio access technology (RAT), over a first transmission interval having a predetermined length, wherein the first transmission interval comprises two or more subintervals of a predetermined, fixed duration, each subinterval corresponding to the smallest interval that can be scheduled for a UE supported by the 5G RAT, and wherein the processing circuitry is configured to schedule the downlink transmission to the first UE by sending a scheduling assignment to the first UE for the downlink transmission;
start the downlink transmission to the first UE in the first transmission interval;
stop the downlink transmission to the first UE prior to an end of the first transmission interval to create a first end of a transmission hole in the downlink transmission to the first UE;
resume the downlink transmission to the first UE at a second end of the transmission hole; and
receive an uplink transmission from a second UE, within the transmission hole, according to the 5G RAT or transmit a higher priority downlink transmission to the second UE in the transmission hole, according to the 5G RAT.

12. A communication network comprising a transmitting node, a first user equipment (UE), and a second UE:
the transmitting node comprising:
transceiver circuitry configured to send and receive transmissions; and
processing circuitry configured via the transceiver circuitry to:
schedule a downlink transmission to the first UE, according to a Fifth Generation (5G) radio access technology (RAT), over a first transmission interval having a predetermined length, wherein the first transmission interval comprises two or more subintervals of a predetermined, fixed duration, each subinterval corresponding to the smallest interval that can be scheduled for a UE supported by the 5G RAT, and wherein the processing circuitry is configured to schedule the downlink transmission to the first UE by sending a scheduling assignment to the first UE for the downlink transmission;
start the downlink transmission to the first UE in the first transmission interval;
stop the downlink transmission to the first UE prior to an end of the first transmission interval to create a first end of a transmission hole in the downlink transmission to the first UE; and
resume the downlink transmission to the first UE at a second end of the transmission hole; and receive an uplink transmission from the second UE, within the transmission hole, according to the 5G RAT, or transmit a higher priority downlink transmission to the second UE in the transmission hole, according to the 5G RAT;

the second UE comprising:

transceiver circuitry configured to send and receive transmissions; and processing circuitry configured via the transceiver circuitry to:

transmit the uplink transmission to the transmitting node within the transmission hole, according the 5G RAT, or receive the higher priority downlink transmission from the transmitting node in the transmission hole, according to the 5G RAT.

* * * * *